US 9,730,540 B2

(12) United States Patent
Tabor et al.

(10) Patent No.: US 9,730,540 B2
(45) Date of Patent: Aug. 15, 2017

(54) CUP LID

(71) Applicant: Berry Plastics Corporation, Evansville, IN (US)

(72) Inventors: Kyle F Tabor, Palos Hills, IL (US); Alexander R Kastelic, Chicago, IL (US)

(73) Assignee: Berry Plastics Corporation, Evansville, IN (US)

( * ) Notice: Subject to any disclaimer, the term of this patent is extended or adjusted under 35 U.S.C. 154(b) by 0 days.

(21) Appl. No.: 14/686,288

(22) Filed: Apr. 14, 2015

(65) Prior Publication Data

US 2015/0216342 A1 Aug. 6, 2015

Related U.S. Application Data

(63) Continuation of application No. 13/448,050, filed on Apr. 16, 2012, now Pat. No. 9,034,231.
(Continued)

(51) Int. Cl.
*A47G 19/22* (2006.01)
*B26F 1/40* (2006.01)
(Continued)

(52) U.S. Cl.
CPC ............ *A47G 19/2272* (2013.01); *B26F 1/40* (2013.01); *B65D 1/265* (2013.01); *B65D 43/02* (2013.01); *B65D 43/0212* (2013.01); *B65D 43/16* (2013.01); *B65D 51/18* (2013.01); *B65D 2251/0021* (2013.01); *B65D 2251/0081* (2013.01); *B65D 2543/00046* (2013.01); *B65D 2543/00092* (2013.01);
(Continued)

(58) Field of Classification Search
CPC .... A47G 19/2272; B65D 43/02; B65D 43/16; B65D 51/18; B65D 43/0212; B65D 1/265; B65D 2251/0081; B65D 2251/0021; B65D 2543/00796; B65D 2543/00092; B65D 2543/00509; B65D 2543/00731; B65D 2543/00; B65D 2543/00657; B65D 2543/00351; B65D 2543/00537; B65D 2543/00296; B65D 2543/00555; B26F 1/40; Y10T 83/0481
USPC ............ 220/254.3, 712, 713; 229/404, 906.1
See application file for complete search history.

(56) References Cited

U.S. PATENT DOCUMENTS

| 1,395,594 A | 11/1921 | Pfefferle |
| 1,755,042 A | 4/1930 | Zoller |

(Continued)

FOREIGN PATENT DOCUMENTS

| CN | 3107990 | 1/1999 |
| CN | 99813627 | 1/1999 |

(Continued)

OTHER PUBLICATIONS

Extended European Search Report for European Patent Application No. 14768275.1, mailed Sep. 14, 2016, BP-409 EP ‖ 5723-238733, 7 pages.
(Continued)

*Primary Examiner* — James N Smalley
(74) *Attorney, Agent, or Firm* — Barnes & Thornburg LLP

(57) ABSTRACT

A liquid container includes a brim forming a mouth opening into a product receiving chamber formed in a cup. A lid is coupled to the rim to close the mouth of the cup.

18 Claims, 9 Drawing Sheets

Related U.S. Application Data

(60) Provisional application No. 61/475,581, filed on Apr. 14, 2011.

(51) Int. Cl.
*B65D 1/26* (2006.01)
*B65D 43/02* (2006.01)
*B65D 43/16* (2006.01)
*B65D 51/18* (2006.01)

(52) U.S. Cl.
CPC .............. *B65D 2543/00296* (2013.01); *B65D 2543/00351* (2013.01); *B65D 2543/00509* (2013.01); *B65D 2543/00537* (2013.01); *B65D 2543/00555* (2013.01); *B65D 2543/00657* (2013.01); *B65D 2543/00685* (2013.01); *B65D 2543/00731* (2013.01); *B65D 2543/00796* (2013.01); *Y10T 83/0481* (2015.04)

(56) References Cited

U.S. PATENT DOCUMENTS

| | | |
|---|---|---|
| 1,773,972 A | 8/1930 | Eberhart |
| 1,940,088 A | 12/1933 | Harrison |
| 2,015,028 A | 9/1935 | Gillette |
| 2,050,487 A | 8/1936 | Durrant |
| 2,120,403 A | 6/1938 | Godfrey |
| D111,097 S | 8/1938 | White |
| 2,174,618 A | 10/1939 | Burdick |
| 2,271,589 A | 2/1942 | Hendrickson |
| 2,374,092 A | 4/1945 | Glaser |
| 2,649,984 A | 8/1953 | Abt |
| 2,766,796 A | 10/1956 | Tupper |
| 2,985,354 A | 5/1961 | Aldington |
| 3,048,317 A | 8/1962 | Cochrane |
| 3,055,540 A | 9/1962 | Ringlen |
| 3,065,875 A | 11/1962 | Negoro |
| 3,071,281 A | 1/1963 | Sawai |
| 3,103,224 A | 9/1963 | Dearling |
| 3,128,903 A | 4/1964 | Crisci |
| 3,245,691 A | 4/1966 | Gorman |
| 3,262,602 A | 7/1966 | McConnell |
| 3,269,734 A | 8/1966 | Ottofy |
| 3,301,459 A | 1/1967 | Gardner |
| 3,329,304 A | 7/1967 | Crisci |
| 3,329,305 A | 7/1967 | Crisci |
| 3,349,950 A | 10/1967 | Wanderer |
| 3,421,653 A | 1/1969 | Whaley |
| 3,433,378 A | 3/1969 | Ross |
| 3,524,566 A | 8/1970 | Parks |
| 3,561,668 A | 2/1971 | Bergstrom |
| 3,583,596 A | 6/1971 | Brewer |
| D221,420 S | 8/1971 | Davis |
| 3,604,588 A | 9/1971 | Winnick |
| 3,609,263 A | 9/1971 | Clementi |
| 3,610,306 A | 10/1971 | Summers |
| 3,612,342 A | 10/1971 | Rathbun |
| 3,624,787 A | 11/1971 | Newman |
| D222,905 S | 2/1972 | Kinney |
| 3,676,089 A | 7/1972 | Swett |
| 3,677,435 A | 7/1972 | Davis |
| 3,679,088 A | 7/1972 | Swett |
| 3,679,089 A | 7/1972 | Swett |
| D226,063 S | 1/1973 | Warnburg |
| 3,734,276 A | 5/1973 | Bank |
| 3,743,133 A | 7/1973 | Rathbun |
| 3,745,055 A | 7/1973 | Gorman |
| 3,746,158 A | 7/1973 | Connick |
| 3,768,688 A | 10/1973 | Linke |
| 3,805,991 A | 4/1974 | Cheladze |
| 3,817,420 A | 6/1974 | Heisler |
| 3,840,144 A | 10/1974 | Dry |
| D233,599 S | 11/1974 | Davis |
| RE28,797 E | 5/1976 | Brewer |
| 3,977,563 A | 8/1976 | Holt |
| 4,006,839 A | 2/1977 | Thiel |
| 4,007,936 A | 2/1977 | Hornsby |
| 4,018,355 A | 4/1977 | Ando |
| 4,026,459 A | 5/1977 | Blanchard |
| 4,054,229 A | 10/1977 | Arfert |
| 4,074,827 A | 2/1978 | Labe |
| 4,078,686 A | 3/1978 | Karesh |
| 4,190,174 A | 2/1980 | Haimowitz |
| 4,194,645 A | 3/1980 | Zabner |
| 4,210,258 A | 7/1980 | von Holdt |
| D256,558 S | 8/1980 | Smith |
| D258,576 S | 3/1981 | Smith |
| 4,266,689 A | 5/1981 | Asher |
| 4,293,080 A | 10/1981 | Letica |
| D264,690 S | 6/1982 | Bagwell |
| 4,349,119 A | 9/1982 | Letica |
| 4,351,448 A | 9/1982 | Ingersoll |
| 4,380,305 A | 4/1983 | Von Holdt |
| 4,389,802 A | 6/1983 | McLaren |
| 4,408,698 A | 10/1983 | Ballester |
| 4,421,244 A | 12/1983 | Van Melle |
| 4,444,332 A | 4/1984 | Widen |
| 4,446,986 A | 5/1984 | Bowen |
| 4,474,305 A | 10/1984 | Marco |
| 4,508,235 A | 4/1985 | Steele |
| 4,518,097 A | 5/1985 | Milton |
| 4,524,882 A | 6/1985 | Buc |
| 4,562,937 A | 1/1986 | Iyengar |
| D286,026 S | 10/1986 | Rayner |
| 4,629,088 A | 12/1986 | Durgin |
| 4,640,434 A | 2/1987 | Johnsen |
| 4,640,435 A | 2/1987 | Dutt |
| 4,674,644 A | 6/1987 | Jacobs |
| 4,679,699 A | 7/1987 | Malsbury |
| D292,380 S | 10/1987 | Smith |
| 4,721,210 A | 1/1988 | Lawrence |
| 4,782,976 A | 11/1988 | Kenyon |
| 4,799,602 A | 1/1989 | Collins |
| 4,836,407 A | 6/1989 | Bruce |
| 4,872,586 A | 10/1989 | Landis |
| 4,886,184 A | 12/1989 | Chamourian |
| 4,934,557 A | 6/1990 | Smith |
| D309,564 S | 7/1990 | Rayner |
| 4,971,211 A | 11/1990 | Lake |
| 5,064,082 A | 11/1991 | Lombardi |
| 5,099,232 A | 3/1992 | Howes |
| 5,111,961 A | 5/1992 | Van Melle |
| 5,151,233 A | 9/1992 | Wendt |
| 5,180,079 A | 1/1993 | Jeng |
| D339,027 S | 9/1993 | Mack |
| 5,375,828 A | 12/1994 | Shikami |
| 5,377,860 A | 1/1995 | Littlejohn |
| 5,390,810 A | 2/1995 | Stroble |
| 5,397,023 A | 3/1995 | Toczek |
| 5,398,843 A | 3/1995 | Warden |
| 5,427,266 A | 6/1995 | Yun |
| 5,460,286 A | 10/1995 | Rush |
| 5,489,026 A | 2/1996 | DAloia |
| 5,509,568 A | 4/1996 | Warden |
| 5,524,788 A | 6/1996 | Plester |
| 5,531,347 A | 7/1996 | Goulding |
| 5,542,532 A | 8/1996 | Mitchell |
| D374,822 S | 10/1996 | Philips |
| 5,592,766 A | 1/1997 | Mygatt |
| 5,613,619 A * | 3/1997 | Van Melle ......... B65D 43/0256 220/254.3 |
| 5,641,063 A | 6/1997 | Gambardella |
| D380,385 S | 7/1997 | Litke |
| D381,267 S | 7/1997 | Rush |
| D384,580 S | 10/1997 | Fernandes |
| 5,713,463 A | 2/1998 | Lakoski |
| 5,722,558 A | 3/1998 | Thompson |
| 5,746,312 A | 5/1998 | Johnson |
| 5,769,263 A | 6/1998 | Willingham |
| 5,791,509 A | 8/1998 | Rush |
| 5,806,707 A | 9/1998 | Boehm |
| 5,820,016 A | 10/1998 | Stropkay |
| 5,829,583 A | 11/1998 | VerWeyst |
| 5,839,601 A | 11/1998 | Van Melle |

(56) References Cited

U.S. PATENT DOCUMENTS

| | | |
|---|---|---|
| 5,894,952 A | 4/1999 | Mendenhall |
| 5,913,964 A | 6/1999 | Melton |
| 5,947,323 A | 9/1999 | Freek et al. |
| 5,979,690 A | 11/1999 | Hartley |
| 6,021,917 A | 2/2000 | Lovell |
| 6,056,144 A | 5/2000 | Strange |
| 6,070,752 A | 6/2000 | Nava |
| D437,223 S | 2/2001 | Coy |
| 6,196,404 B1 | 3/2001 | Chen |
| 6,196,411 B1 | 3/2001 | Nava |
| 6,216,857 B1 | 4/2001 | Gordon |
| 6,257,435 B1 | 7/2001 | Chedister |
| 6,257,629 B1 | 7/2001 | Weichelt |
| 6,299,014 B1 | 10/2001 | Nava |
| 6,302,288 B1 | 10/2001 | Nava |
| 6,311,860 B1 | 11/2001 | Reidinger |
| D452,155 S | 12/2001 | Stodd |
| 6,330,943 B1 | 12/2001 | Gordon |
| 6,349,821 B1 | 2/2002 | Gordon |
| 6,357,619 B1 | 3/2002 | Schaefer |
| 6,364,102 B1 | 4/2002 | Gordon |
| 6,371,289 B1 | 4/2002 | Gordon |
| 6,404,730 B2 | 6/2002 | Yeo |
| 6,412,629 B1 | 7/2002 | Gordon |
| 6,419,112 B1 | 7/2002 | Bruce |
| 6,454,087 B2 | 9/2002 | Gordon |
| 6,460,716 B1 | 10/2002 | Wong |
| 6,464,072 B2 | 10/2002 | Gordon |
| 6,478,148 B2 | 11/2002 | Gordon |
| 6,481,573 B2 | 11/2002 | Gordon |
| D469,693 S | 2/2003 | Weiss |
| 6,533,114 B1 | 3/2003 | Gordon |
| 6,557,698 B2 | 5/2003 | Gordon |
| 6,561,345 B2 | 5/2003 | Gordon |
| 6,571,943 B2 | 6/2003 | Gordon |
| 6,588,182 B2 | 7/2003 | Gordon |
| 6,598,741 B2 | 7/2003 | Gordon |
| 6,604,629 B2 | 8/2003 | Gordon |
| 6,612,456 B1 | 9/2003 | Hundley |
| 6,625,959 B2 | 9/2003 | Gordon |
| 6,626,288 B2 | 9/2003 | Gordon |
| 6,647,696 B2 | 11/2003 | Gordon |
| 6,648,134 B2 | 11/2003 | Gordon |
| 6,688,487 B2 | 2/2004 | Oakes |
| 6,840,375 B2 | 1/2005 | Gordon |
| D502,050 S | 2/2005 | Munson |
| 6,874,649 B2 | 4/2005 | Clarke |
| 6,886,707 B2 | 5/2005 | Giraud |
| 6,889,860 B2 | 5/2005 | Mazzarolo |
| 6,910,599 B2 | 6/2005 | Tucker |
| 6,929,143 B2 | 8/2005 | Mazzarolo |
| 6,932,234 B2 | 8/2005 | DAmato |
| 6,948,633 B2 | 9/2005 | Freek |
| 6,959,829 B2 | 11/2005 | Crider |
| D516,910 S | 3/2006 | Bresler |
| D517,322 S | 3/2006 | Zettle |
| D519,374 S | 4/2006 | Hornke |
| D521,382 S | 5/2006 | Gross |
| 7,055,715 B2 | 6/2006 | Maravich et al. |
| 7,063,224 B2 | 6/2006 | Clarke |
| D525,869 S | 8/2006 | Tedford |
| D527,261 S | 8/2006 | Hornke |
| 7,100,787 B2 | 9/2006 | Farnsworth |
| D533,777 S | 12/2006 | Hundley |
| 7,156,251 B2 | 1/2007 | Smith |
| 7,159,732 B2 | 1/2007 | Smith |
| 7,175,042 B2 | 2/2007 | Durdon |
| 7,225,945 B2 | 6/2007 | Crider |
| 7,284,676 B2 | 10/2007 | Dantani |
| D556,574 S | 12/2007 | Hollis |
| D560,120 S | 1/2008 | Maravich |
| 7,318,536 B2 | 1/2008 | Maravich |
| 7,318,563 B2 | 1/2008 | Houts |
| 7,328,791 B1 | 2/2008 | Bosworth |
| D564,354 S | 3/2008 | Maravich |
| 7,353,582 B2 | 4/2008 | MacKenzie |
| D569,245 S | 5/2008 | Joshi |
| D570,685 S | 6/2008 | Koennecke |
| D570,686 S | 6/2008 | Hollis |
| D574,238 S | 8/2008 | Walker |
| 7,464,831 B2 | 12/2008 | Aiken |
| 7,484,639 B2 | 2/2009 | Maravich |
| 7,513,382 B2 | 4/2009 | Clarke |
| D592,952 S | 5/2009 | Hundley |
| 7,549,559 B2 | 6/2009 | Conroy |
| 7,676,909 B2 | 3/2010 | MacKenzie |
| 7,691,302 B2 | 4/2010 | Hollis |
| 7,784,641 B2 | 8/2010 | Chou |
| D624,413 S | 9/2010 | Selina |
| 7,819,271 B2 | 10/2010 | Hollis |
| 7,845,514 B2 | 12/2010 | Rush |
| 7,992,741 B2 | 8/2011 | Hundley |
| 8,074,331 B2 | 12/2011 | Voges |
| 8,074,831 B2 | 12/2011 | Walker |
| 8,113,379 B2 | 2/2012 | Cai |
| 8,276,776 B2 | 10/2012 | Roth |
| 8,317,050 B2 | 11/2012 | Hollis |
| 8,430,268 B2 | 4/2013 | Weiss |
| 8,544,677 B2 | 10/2013 | Selina |
| 8,616,405 B2 | 12/2013 | French |
| D696,940 S | 1/2014 | Hale |
| 9,034,231 B2 | 5/2015 | Tabor |
| 2002/0027139 A1 | 3/2002 | ONeill |
| 2002/0037378 A1 | 3/2002 | Littlejohn |
| 2002/0189957 A1 | 12/2002 | Gordon |
| 2003/0062272 A1 | 4/2003 | Gordon |
| 2003/0089714 A1 | 5/2003 | Dart |
| 2003/0089726 A1 | 5/2003 | Mazzarolo |
| 2003/0155353 A1 | 8/2003 | Tucker |
| 2003/0192890 A1 | 10/2003 | Mazzarolo |
| 2004/0011803 A1 | 1/2004 | DAmato |
| 2004/0094553 A1 | 5/2004 | Crider |
| 2004/0134911 A1 | 7/2004 | Padovani |
| 2004/0159080 A1 | 8/2004 | Stewart |
| 2004/0178199 A1 | 9/2004 | Stroup |
| 2004/0217033 A1 | 11/2004 | Gordon |
| 2004/0222226 A1 | 11/2004 | Gottainer |
| 2004/0245261 A1 | 12/2004 | Stanos |
| 2005/0051442 A1 | 3/2005 | Gordon |
| 2005/0082177 A1 | 4/2005 | Weiss |
| 2005/0092749 A1 | 5/2005 | Durdon |
| 2005/0109780 A1 | 5/2005 | Pendergrass |
| 2005/0155969 A1 | 7/2005 | Clarke |
| 2005/0167294 A1 | 8/2005 | Swayne |
| 2005/0178766 A1 | 8/2005 | Washington |
| 2005/0210085 A1 | 9/2005 | Bessiere |
| 2005/0224505 A1 | 10/2005 | Brown |
| 2005/0230406 A1 | 10/2005 | Maravich |
| 2005/0263413 A1 | 12/2005 | Harman |
| 2005/0269328 A1 | 12/2005 | Crider |
| 2006/0060589 A1 | 3/2006 | Lee |
| 2006/0071008 A1 | 4/2006 | Sadlier |
| 2006/0096983 A1 | 5/2006 | Patterson |
| 2006/0180028 A1 | 8/2006 | Burchard |
| 2006/0213908 A1 | 9/2006 | Clarke |
| 2006/0226148 A1* | 10/2006 | Hundley ............ B65D 43/0212 220/254.3 |
| 2006/0255038 A1 | 11/2006 | Hollis |
| 2007/0007298 A1 | 1/2007 | Tucker |
| 2007/0034629 A1 | 2/2007 | Mazzarolo |
| 2007/0062943 A1 | 3/2007 | Bosworth |
| 2007/0075080 A1 | 4/2007 | Farnsworth |
| 2008/0035681 A1 | 2/2008 | Skillin |
| 2008/0105696 A1 | 5/2008 | Dart |
| 2008/0197134 A1 | 8/2008 | Maxwell |
| 2008/0245792 A1* | 10/2008 | Chou ................ B65D 47/0847 220/254.3 |
| 2009/0223961 A1 | 9/2009 | Wang |
| 2009/0266829 A1 | 10/2009 | Bailey |
| 2009/0272742 A1 | 11/2009 | Dybala |
| 2009/0308882 A1 | 12/2009 | Hundley |
| 2010/0037780 A1 | 2/2010 | Pas et al. |
| 2011/0011863 A1 | 1/2011 | Hollis |
| 2012/0024871 A1 | 2/2012 | Hundley |

(56) References Cited

U.S. PATENT DOCUMENTS

| | | |
|---|---|---|
| 2012/0048856 A1 | 3/2012 | Walker |
| 2012/0132699 A1 | 5/2012 | Mann |
| 2012/0261417 A1 | 10/2012 | Tabor |
| 2012/0272622 A1 | 11/2012 | Weiss |
| 2013/0020338 A1 | 1/2013 | French |
| 2013/0037558 A1 | 2/2013 | Selina |
| 2013/0277380 A1 | 10/2013 | Koestring |
| 2014/0284344 A1 | 9/2014 | French |

FOREIGN PATENT DOCUMENTS

| | | |
|---|---|---|
| CN | 99813014 | 9/1999 |
| DE | 20116771 U1 | 12/2001 |
| DE | 20301404 U1 | 5/2003 |
| WO | 0018662 | 4/2000 |
| WO | 0018663 | 4/2000 |
| WO | 0185575 | 11/2001 |
| WO | 03011716 | 2/2003 |
| WO | 2004014776 | 2/2004 |
| WO | 2005013247 A1 | 2/2005 |

OTHER PUBLICATIONS

Office Action dated Sep. 30, 2016 for U.S. Appl. No. 14/214,236.
Chinese Office Action for Chinese App. No. 201480010419.3 dated Dec. 22, 2016, 4 pages.
International Search Report for PCT/US06/32565, dated May 24, 2007.
Supplementary European Search Report dated Apr. 6, 2009, for European Patent Application No. 05735742.8.

* cited by examiner

CUP LID

PRIORITY CLAIM

This application is a continuation of U.S. application Ser. No. 13/448,050, filed Apr. 16, 2012, which claims priority under 35 U.S.C. §119(e) to U.S. Provisional Application Ser. No. 61/475,581, filed Apr. 14, 2011, which is expressly incorporated by reference herein.

BACKGROUND

The present disclosure relates to lids, and particularly to lids for drink cups. More particularly, the present disclosure relates to a cup lid that includes a rim that mates with a brim included in a drink cup.

SUMMARY

According to the present disclosure, a container includes a cup and a lid. The lid is adapted to mate with a brim included in a cup to close a top aperture opening into an interior liquid-storage region formed in the cup.

In illustrative embodiments, a lid for a cup includes a ring-shaped brim mount and a central closure. The ring-shaped brim mount is adapted to couple the lid to a brim included in the cup. The central closure includes an elevated basin arranged to lie in spaced-apart relation above the ring-shaped brim mount and formed to include both a sip aperture and a well aperture in a planar portion of the elevated basin. The central closure further includes a product-retaining shell coupled to a perimeter of the elevated basin and arranged to extend toward and couple to the ring-shaped brim mount.

In illustrative embodiments, the lid further includes a sip flap. The sip flap includes a sip-flap tab and a sip-flap hinge arranged to extend between and interconnect the sip-flap tab to the elevated basin. The sip-flap hinge allows the sip-flap tab to move between a closed position in which the sip-flap tab lies in and closes the sip aperture and an opened position in which sip aperture is open to allow communication of fluids there through.

In illustrative embodiments, the central closure further includes a well and a nub. The well is coupled to the elevated basin and arranged to extend toward the ring-shaped brim mount. The well aperture is arranged to open into the well. The nub is coupled to the sip-flap tab to move therewith. When the sip flap is in the opened position, the nub extends into the well through the nub aperture.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 7 is a sectional view taken along line 4-4 of FIGS. 2 and 3 showing the sip flap in the closed position;

FIG. 8 is a view similar to FIG. 7 showing the sip flap positioned to lie about midway between the closed position of FIGS. 2, 3, and 7 and the opened position as suggested in FIG. 9;

FIG. 9 is a view similar to FIG. 8 showing the sip flap in the opened position and mated with the straw receiver to retain the sip flap in the opened position;

DETAILED DESCRIPTION

Figure 15:
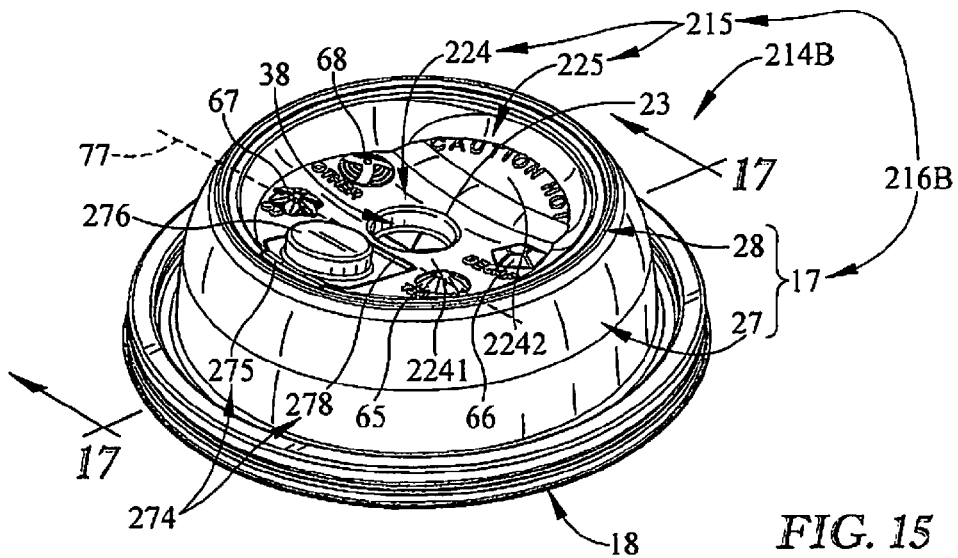
FIG. 15 is a perspective view of another embodiment of a lid in accordance with the present disclosure showing the lid in the beverage mode.
Figure 16:
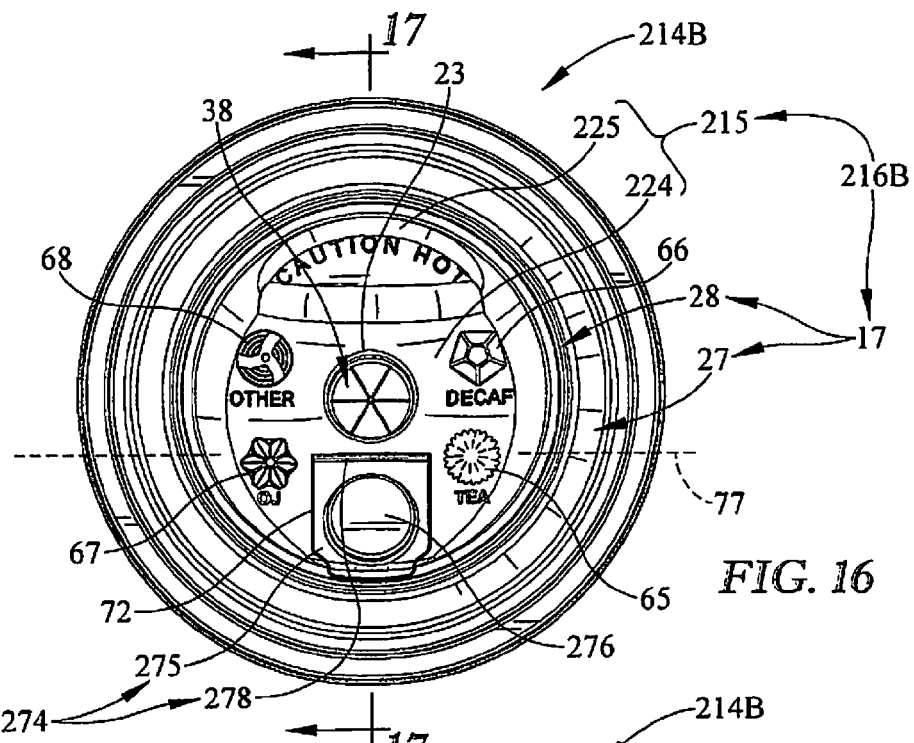
FIG. 16 is plan view of the lid of FIG. 15 in the beverage mode.
Figure 17:
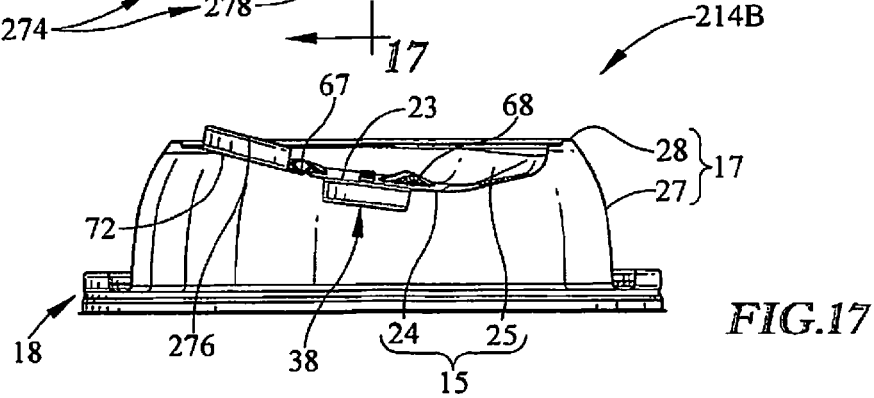
FIG. 17 is a sectional view taken along line 17-17 of FIGS. 15 and 16.

A first embodiment of a lid 14B in accordance with the present disclosure is shown in FIGS. 1-9. A second embodiment of a lid 14D in accordance with the present disclosure is shown in FIGS. 1 and 1-12A. A third embodiment of a lid in accordance with the present disclosure is shown in FIGS. 15-17. Lids 14B, 216B are configured for use with hot or cold beverages, for example, coffee or soda. Lid 14D is configured for use with desserts, for example, ice cream.

Figure 1:
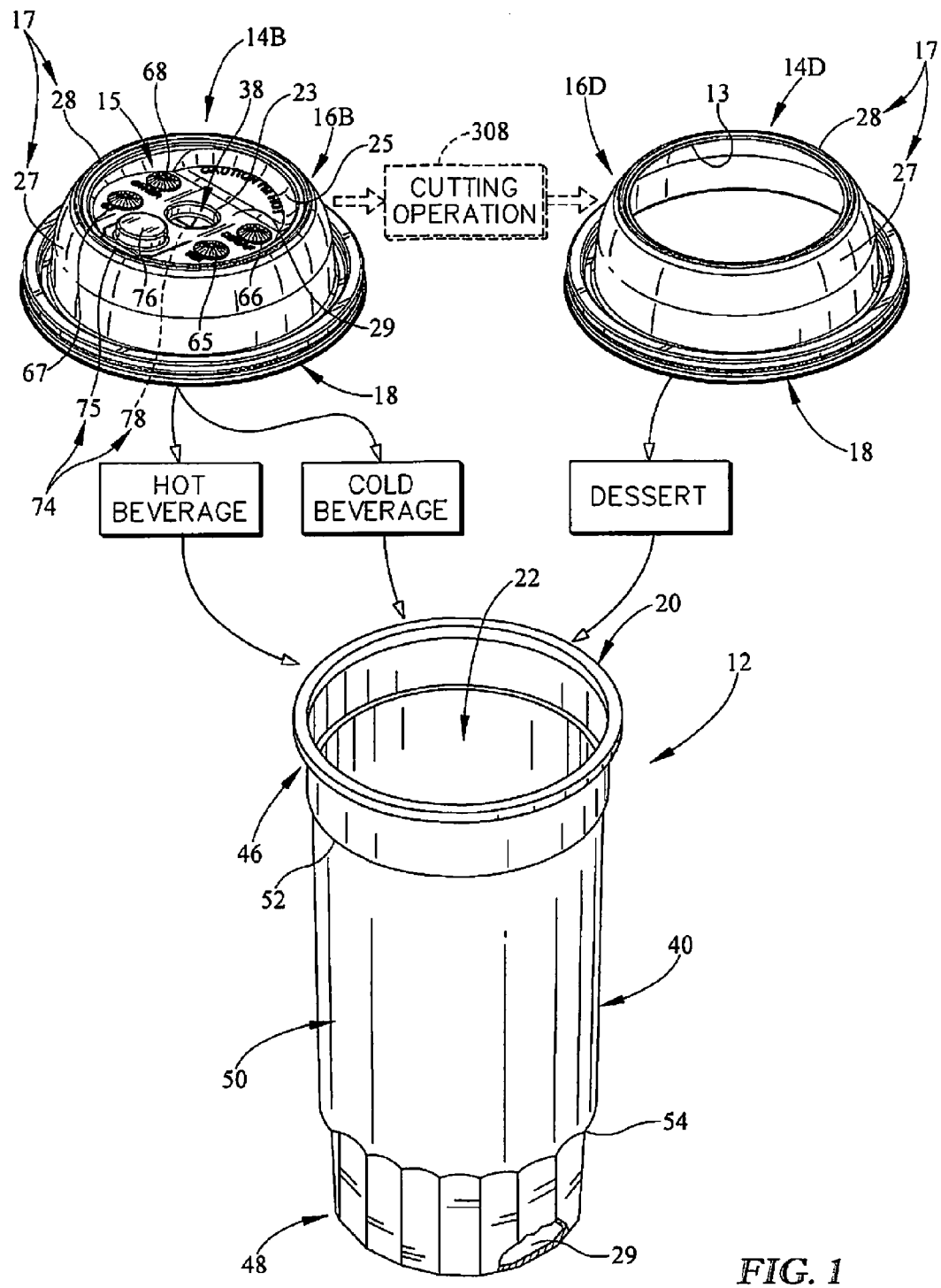
FIG. 1 is a perspective view and diagrammatic view of two different embodiments of lids in accordance with the present disclosure that each lid may be used with a cup when different products are placed in the cup.

A lid 14B is adapted for mating to a cup 12 as suggested in FIG. 1. Lid 14B includes a ring-shaped brim mount 18, a central closure 16B, and a sip flap 74 as suggested in FIGS. 1-9. Ring-shaped brim mount 18 has a round shape with a center point located on a central axis of lid 14B as suggested in FIGS. 4 and 7-9. Ring-shaped brim mount 18 is adapted to couple to a brim 20 included in cup 12 as suggested in FIGS. 5 and 6.

Figure 7:
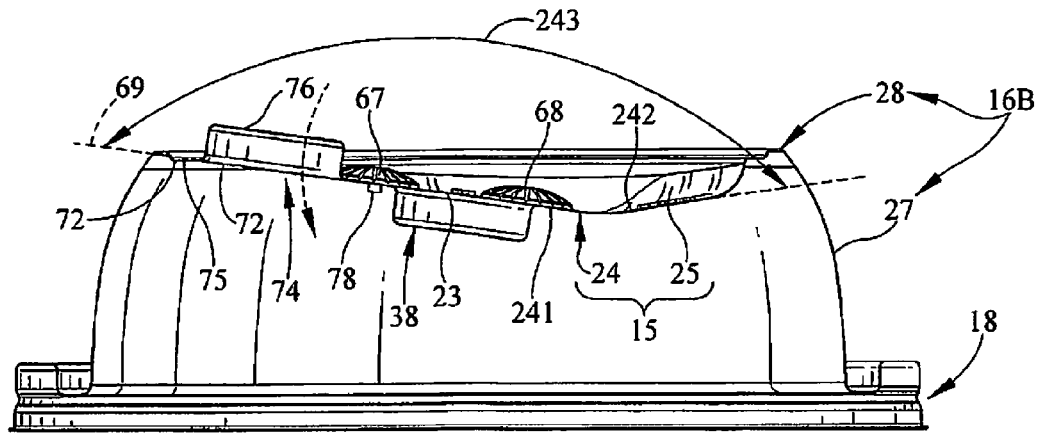
FIGS. 7-9 are a series of elevation views showing movement of the sip flap from the closed position of FIG. 6 to the opened position of FIG. 9.
Figure 14:
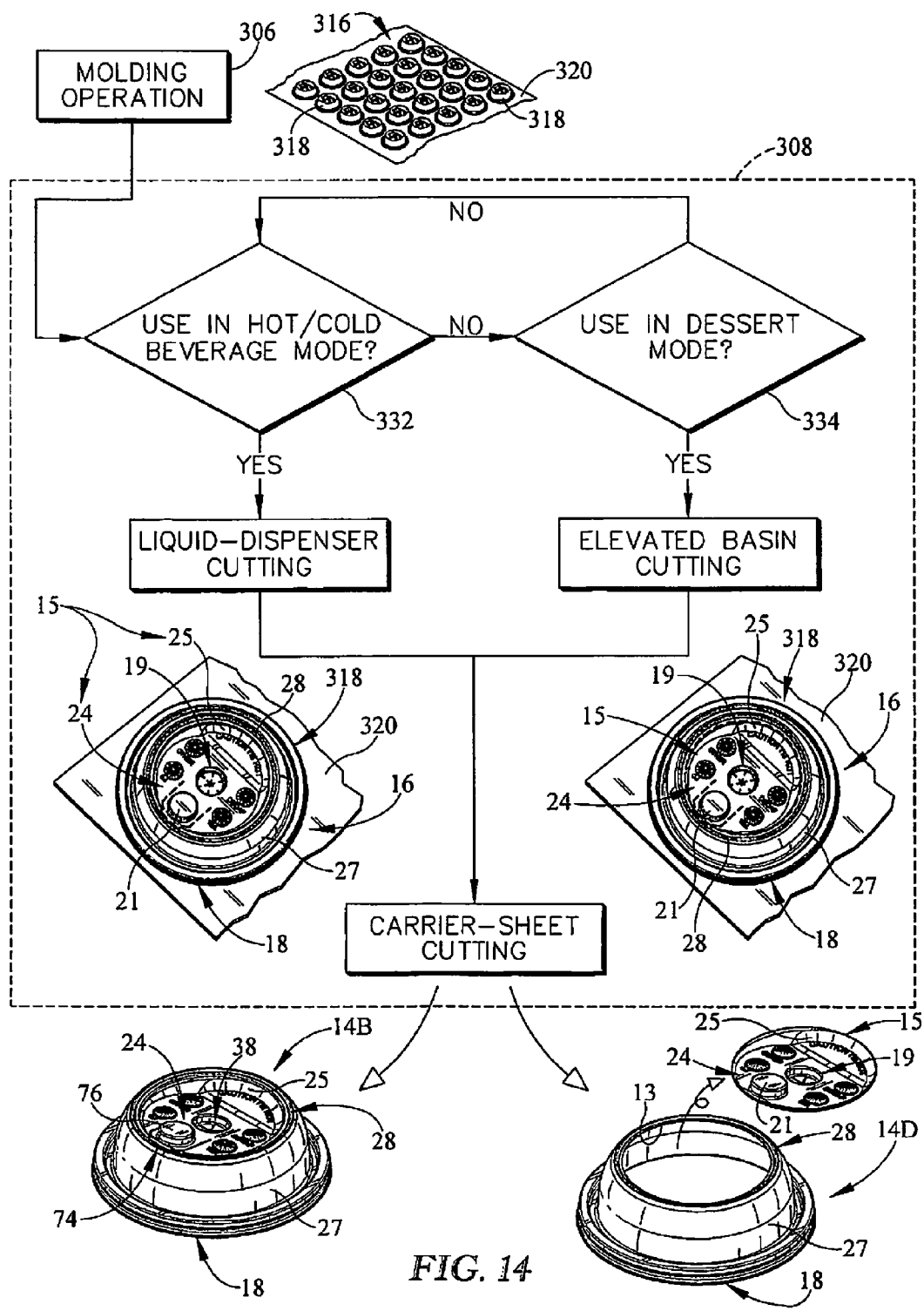
FIG. 14 is a perspective and diagrammatic view of the cutting stage of the lid-manufacturing process of FIG. 13.

Central closure 16B includes an elevated basin 15, a product-retaining shell 17, a well 19, and a nub 21 as suggested in FIG. 14. Elevated basin 15 is arranged to lie in spaced-apart relation above ring-shaped brim mount 18 and is formed to include a sip aperture 72 and a well aperture 23 as suggested in FIGS. 7-9. Product-retaining shell 17 is coupled to a perimeter of elevated basin 15 and arranged to extend toward and couple to ring-shaped brim mount 18 as suggested in FIG. 7. Well 19 is coupled to elevated basin 15 and is arranged to extend toward ring-shaped brim mount 18 as shown in FIG. 7. Nub 21 is coupled to elevated basin 15 and arranged to extend away from ring-shaped brim mount 18 as shown in FIG. 7. Elevated basin 15 includes a planar portion 2241 formed to include sip aperture 72 and well aperture 23 as suggested in FIGS. 2-3.

Figure 2:
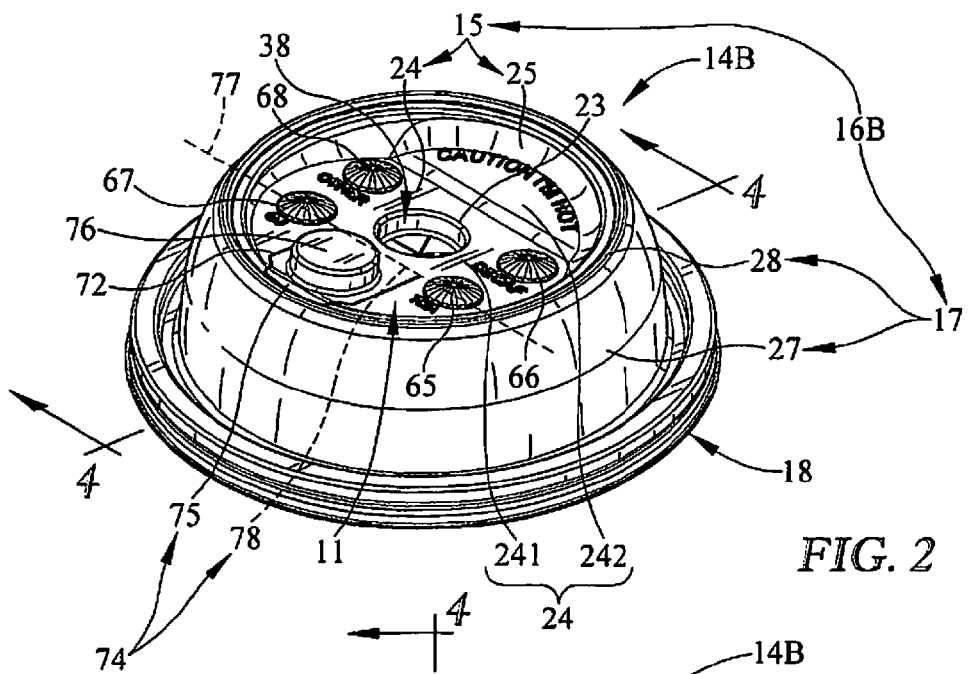
FIG. 2 is a perspective view of the first embodiment of the lid of FIG. 1 for use in a beverage mode showing that the lid includes a straw receiver in a center portion of the lid, a sip flap in a closed position closing a sip aperture formed in an outer portion of the lid, and four deformable product-identification domes spaced around the straw receiver.
Figure 3:
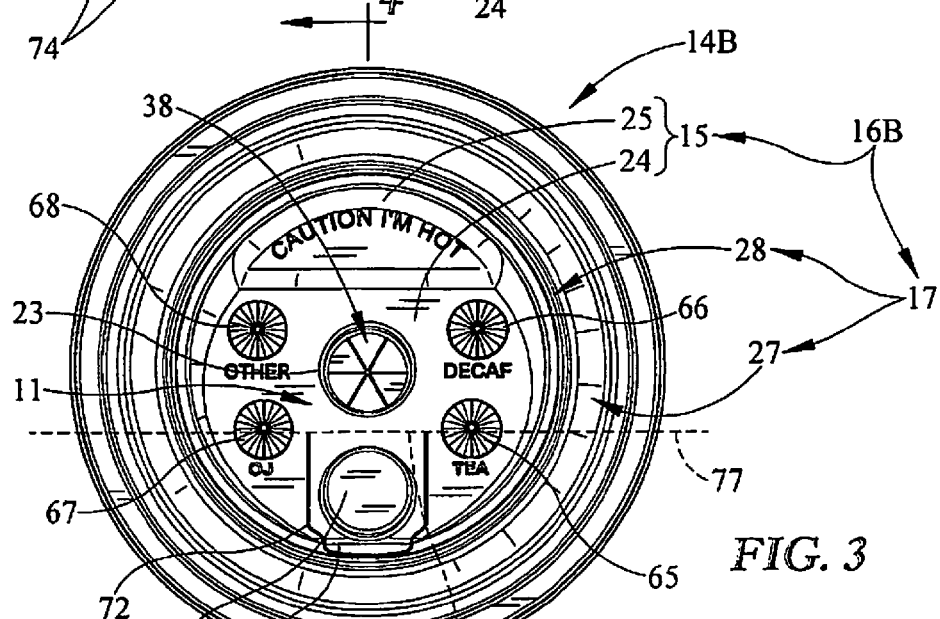
FIG. 3 is a plan view of the first embodiment of the lid of FIGS. 1 and 2 in the beverage mode.
Figure 4:
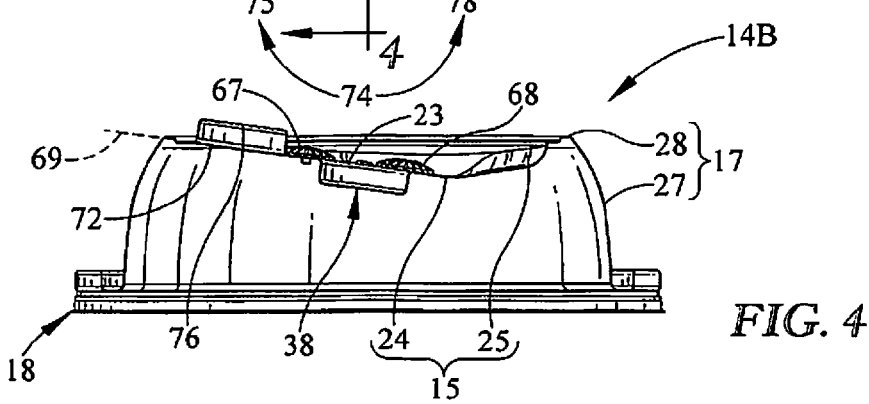
FIG. 4 is a sectional view taken along line 4-4 of FIGS. 2 and 3.

Sip flap 74 includes a sip-flap tab 75 and a sip-flap hinge 78 as suggested in FIGS. 2-4. Sip-flap hinge 78 is arranged to extend between and interconnect sip-flap tab 75 and elevated basin 15 to allow sip-flap tab 75 to move between a closed position in which sip-flap tab 75 lies in and closes sip aperture 72 and an opened position in which nub 21 extends into well aperture 23.

Another embodiment of a lid 214B for cup 12 is shown, for example, in FIGS. 15-17. Lid 214B includes ring-shaped brim mount 18, a central closure 216B, and a sip flap 274 as suggested in FIGS. 15-17. Ring-shaped brim mount 18 has a round shape with a center point located on a central axis of the lid as suggested in FIG. 17. Ring-shaped brim mount 18 is adapted to couple to brim 20 included in cup 12.

Central closure 216B includes an elevated basin 215 and an annular product-retaining shell 17 as suggested in FIGS. 15-17. Elevated basin 215 is arranged to lie above and in spaced-apart relation to ring-shaped brim mount 18 as suggested in FIGS. 15-17. Elevated basin 215 includes a floor 224 having a planar portion 2241 formed to include a sip aperture 72 and a well aperture 23 therein as suggested in FIGS. 15-17. Annular product-retaining shell 17 is coupled to a perimeter of elevated basin 215 and arranged to extend downwardly toward ring-shaped brim mount 18 to couple to ring-shaped brim mount 18 as suggested in FIGS. 15-17.

Sip flap 274 includes a sip-flap tab 275 and a sip-flap hinge 278 as suggested in FIG. 15. Sip-flap tab 275 is coupled to planar portion 2241 of floor 224 by sip-flap hinge 278 as shown in FIG. 15. Sip-flap hinge 278 is operable to allow sip-flap tab 275 to move between a closed position in which sip-flap tab 275 lies in and closes sip aperture 72 and an opened position in which a portion of sip-flap tab 275 extends into well aperture 23 as suggested in FIGS. 9 and 15-17.

Figure 9:
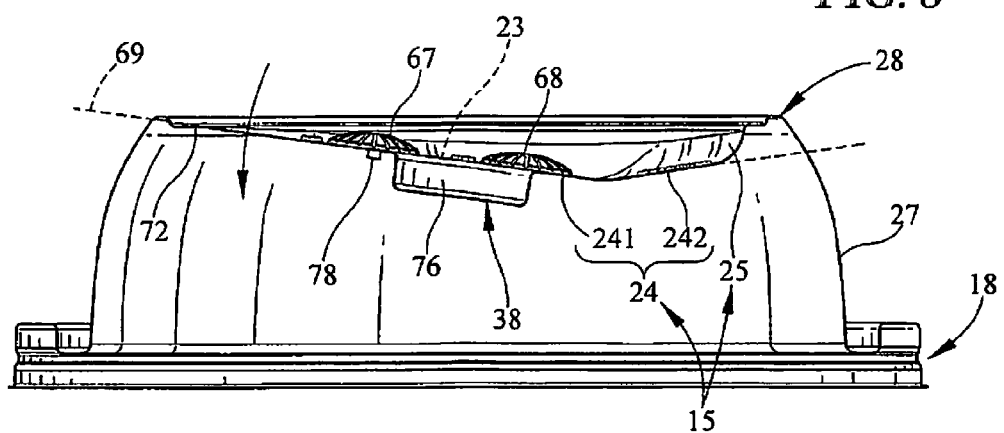

As suggested in FIG. 9, sip flap 274 pivots about a tab axis 77 relative to elevated basin 215 about 180 degrees to move from the closed position to the opened position. Sip-flap tab 275 is about parallel to planar portion 2241 of elevated basin 215 when sip-flap tab 275 is in the closed position as suggested in FIGS. 9 and 15-17. Tab axis 77 and sip-flap hinge 278 are located between sip aperture 72 and well aperture 23 as suggested in FIG. 15. Nub 276, also called nub 21, is coupled to sip-flap tab 275 to move therewith as suggested in FIGS. 15-17. Nub 276 is arranged to extend above the annular product-retaining shell 17 when sip-flap tab 275 is in the closed position as shown in FIG. 17. A well 38, also called well 19, is coupled to elevated basin 215 and arranged to extend below elevated basin 215 as shown in FIG. 17. Well aperture 23 is arranged to open into well 19 as suggested in FIG. 15. Sip aperture 72 and well aperture 23 are located between ring-shaped brim mount 18 and a top wall 28 of annular product-retaining shell 17 as suggested in FIG. 16. Sip aperture 72 and well aperture 23 are in coplanar relation to one another as suggested in FIG. 17. Well aperture 23 is located radially inward of sip aperture 72 between sip aperture 72 and the central axis as suggested in FIGS. 15-17.

Figure 10:
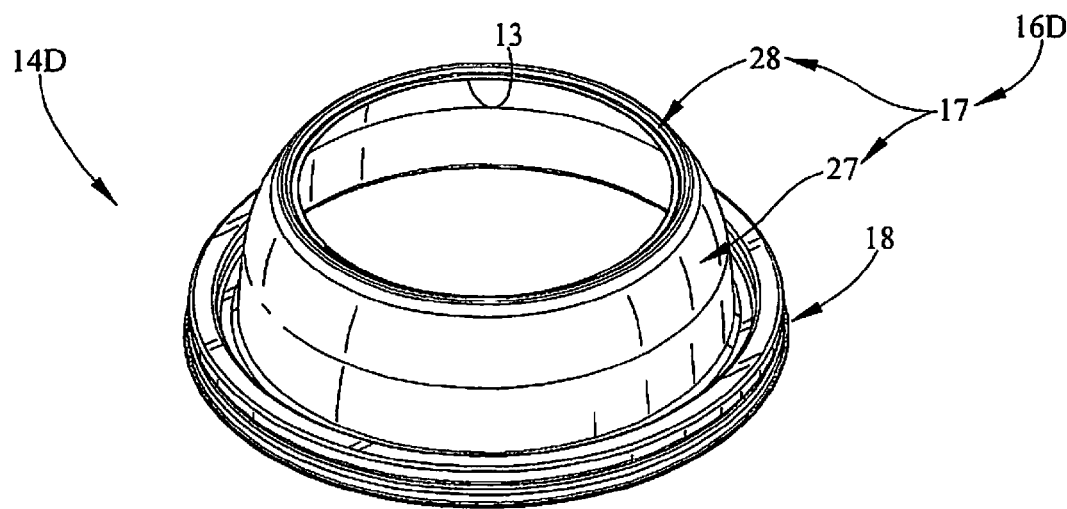
FIG. 10 is a perspective view of the second embodiment of the lid of FIG. 1 in a dessert mode showing that the lid includes a rim for coupling the lid to the cup and a product-retaining shell extending upwardly away from the rim and showing that lid is formed to include a utensil-receiving aperture.
Figure 11:
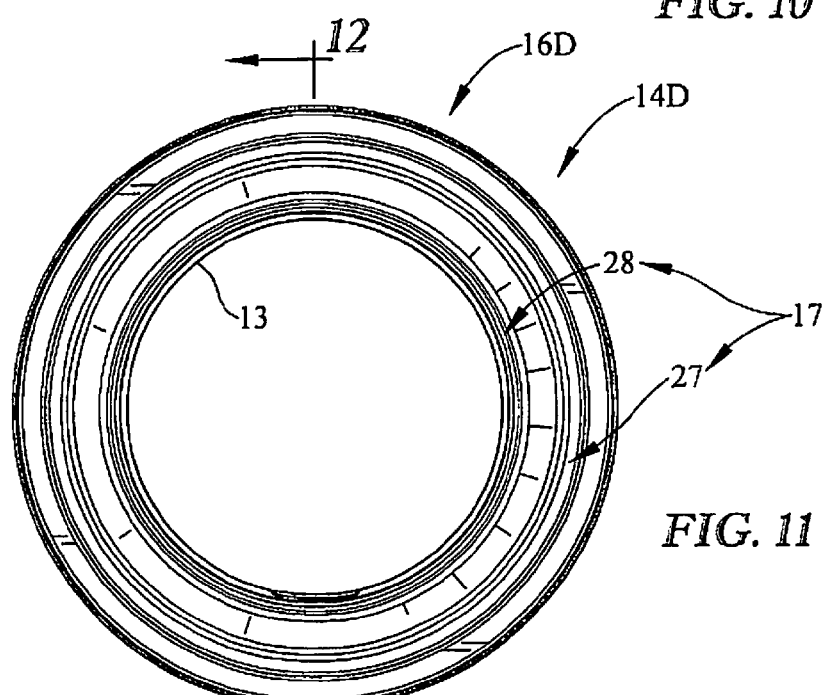
FIG. 11 is a plan view of the lid of FIG. 10 in the dessert mode.
Figure 12:
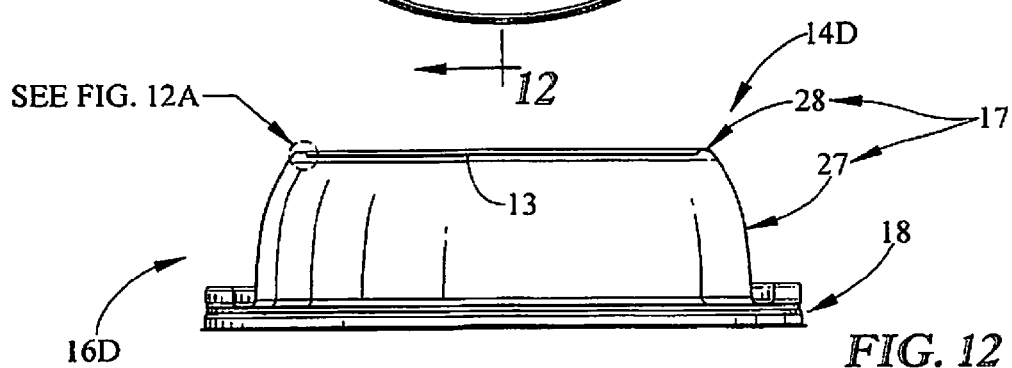
FIG. 12 is a sectional view taken along line 12-12 of FIG. 11.
Figure 13:
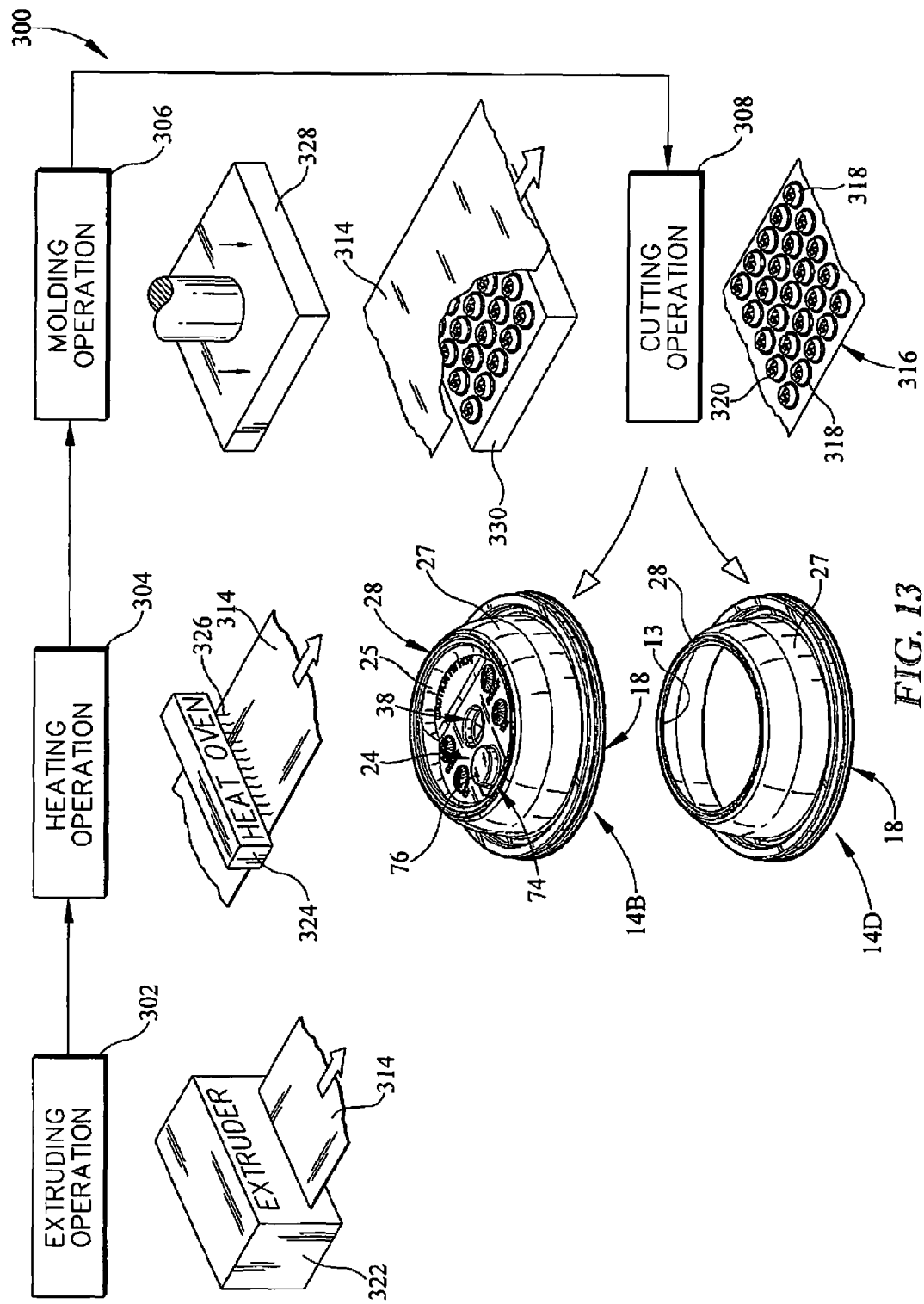
FIG. 13 is a perspective and diagrammatic view of a lid-manufacturing process in accordance with the present disclosure.

A liquid container includes a cup 12 and a lid configured in either a beverage mode as shown, for example, in FIGS. 1-9 or a dessert mode as shown in FIGS. 10-12. An illustrative lid-manufacturing process 300 is used to form either a lid 14B in the beverage mode or a lid 14D in the dessert mode as shown in FIGS. 13 and 14. As suggested in FIG. 1, lid 14B in the beverage mode is converted to lid 14D in the dessert mode by applying a cutting operation 308 so that a utensil-receiving aperture 13 is established. Another embodiment of a lid 214B in the beverage mode is shown in FIGS. 15-17. Lid 214B may also be process according to lid-manufacturing process 300 to form a lid in dessert mode.

Lid 14B, configured in the beverage mode, includes a central closure 16B and ring-shaped brim mount 18 as shown in FIGS. 1-4. Ring-shaped brim mount 18 is configured to mount on a brim 20 included in cup 12. Central closure 16B is appended to ring-shaped brim mount 18 to extend upwardly away from brim 20 of cup 12 to close a mouth opening into a product-receiving chamber 22 formed in cup 12 as suggested in FIGS. 1 and 5 and shown in FIG. 6.

Lid 14D, configured in the dessert mode, includes a central closure 16D and ring-shaped brim mount 18 as shown in FIGS. 1 and 10-12. Ring-shaped brim mount 18 is the same on both lids 14B and 14D. Central closure 16B of lid 14B may be converted to central closure 16D by cutting operation 308 as suggested in FIG. 14. Cutting operation 308 operates to remove a portion of central closure 16D and form utensil-receiving aperture 13 that opens into product-receiving chamber 22 to receive a utensil, such as a spoon, therein. As a result of ring-shaped brim mount 18 being the same in both beverage mode and dessert mode, either lid 14B or 14D may be coupled to the same cup 12.

A lid-manufacturing process 300 includes the steps of providing a non-perforated cover 318, converting non-perforated cover 318 into a first perforated (beverage) lid 14B when first perforated (beverage) lid 14B is desired, and converting non-perforated cover 318 into a second perforated (dessert) lid 14D when second perforated (dessert) lid 14D is desired. Non-perforated cover 318 may be provided as shown, for example, in FIG. 13. Converting non-perforated cover 318 into first or second perforated lids 14B, 14D may be done as shown, for example, in FIG. 14.

Non-perforated cover 318 includes a central closure 16 and ring-shaped brim mount 18 as shown in FIG. 14. Ring-shaped brim mount 18 is unchanged during conversion of non-perforated cover 318 into first perforated lid 14B or second perforated lid 14D. Central closure 16 includes an elevated basin 15, a product-retaining shell 17, a central well 19, and a nub 21 as shown in FIG. 14. Elevated basin 15 is arranged to lie spaced apart above ring-shaped brim mount 18. Product-retaining shell 17 is coupled to a perimeter of elevated basin 15 to extend away from elevated basin 15 downwardly to couple to ring-shaped brim mount 18. Central well 19 is appended to elevated basin 15 to extend downwardly toward ring-shaped brim mount 18. Nub 21 is appended to elevated basin 15 to extend upwardly away from ring-shaped brim mount 18. Product-retaining shell 17 remains substantially unchanged during conversion of non-perforated cover 318 to lids 14B or 14D.

Non-perforated cover 318 is converted into first perforated (beverage) lid 14B by making a straw-receiver cut in elevated basin 15 and a sip-flap cut in central closure 16. Straw-receiver cut forms a straw receiver 38 that is adapted to receive a straw therein. In another example, the straw-receiver cut is formed in central well 19 converting central well 19 into straw receiver 38. Sip-flap cut forms a sip aperture 72 in central closure 16 and a sip flap 74 from a portion of central closure 16.

Lid 14B includes a central closure 16B and ring-shaped brim mount 18 as shown in FIGS. 1-4. Ring-shaped brim mount 18 is configured to mount on a brim 20 included in cup 12. Central closure 16B is appended to ring-shaped brim mount 18 to extend upwardly away from brim 20 of cup 12 to close the mouth opening into product-receiving chamber 22 formed in cup 12.

Central closure 16B includes elevated basin 15, product-retaining shell 17, straw receiver 38, and straw-receiver closure 76 as shown in FIGS. 1-4. Elevated basin 15 is arranged to lie spaced apart above ring-shaped brim mount 18. Product-retaining shell 17 is coupled to a perimeter of elevated basin 15 to extend away from elevated basin 15 downwardly to couple to ring-shaped brim mount 18. Straw receiver 38 is appended to elevated basin 15 to extend downwardly toward ring-shaped brim mount 18. Straw-receiver closure 76 is appended to elevated basin 15 to extend upwardly away from ring-shaped brim mount 18. Product-retaining shell 17 remains substantially unchanged during conversion of non-perforated cover 318 to lid 14B or lid 14D.

Figure 8:
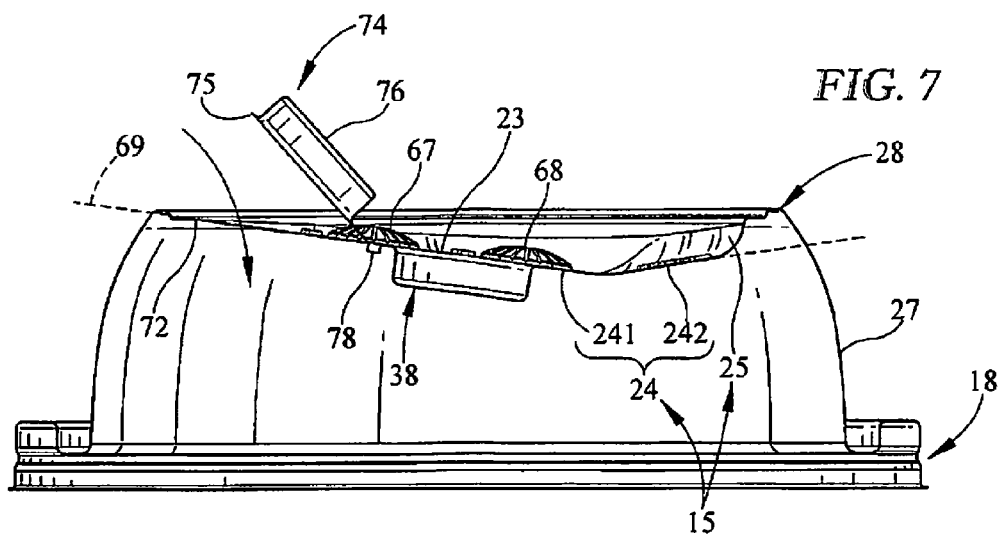

Elevated basin 15 includes a raised floor 24 and a curved liquid-retaining wall 25 as shown in FIGS. 7-9. Raised floor 24 is coupled to product-retaining shell 17. Curved liquid-retaining wall 25 is coupled to raised floor 24 to extend between and interconnect raised floor 24 to product-retaining shell 17.

Raised floor 24 includes a first floor panel 241 and a second floor panel 242 as shown in FIGS. 7-9. First floor panel 241 is coupled to product-retaining shell 17 to extend downwardly toward ring-shaped brim mount 18. Second floor panel 242 is coupled to first floor panel 241 to extend upwardly away from first floor panel 241 toward curved liquid-retaining wall 25 as shown in FIG. 4.

During cutting operation 308, a sip flap 74 is formed in central closure 16B. Sip flap 74 includes, for example, a sip-flap tab 75 and a sip-flap hinge 78 as shown in FIGS. 2-4. Sip-flap hinge 78 interconnects sip-flap tab 75 to elevated basin 15 so that sip-flap tab 75 is movable between a closed position shown in FIG. 7 and an opened position shown in FIG. 9. Sip-flap tab 75 when in the closed position lies in and closes first aperture 23 opening into straw receiver 38. Sip-flap tab 75 pivots about a tab axis 77 from the opened position to the closed position to lie in spaced-apart relation to sip aperture 72. Sip-flap hinge 78 extends downwardly toward ring-shaped brim mount 18 as shown in FIGS. 7-9.

Non-perforated cover 318 may also be converted into second perforated (dessert) lid 14D by making a utensil-receiver cut in central closure 16 to separate elevated basin 15 from product-retaining shell 17. As a result, utensil-receiving aperture 13 is formed in central closure 16 that is adapted to receive a utensil such as a spoon therein.

In one example, in accordance with the present disclosure, the straw-receiver cut is made before the sip-flap cut. In another example, the sip-flap cut is made before the straw-receiver cut. In still yet another example, the sip-flap cut and the straw-receiver cut are made at about the same time.

Lid-manufacturing process 300 provides lid 14B in beverage mode or a lid 14D in dessert mode as desired by a user. Lid-manufacturing process 300 includes a series of operations used to make either lid 14B or 14D as shown in FIGS. 13 and 14. Lid-manufacturing process 300 includes an extrusion operation 302, a heating operation 304, a molding operation 306, and a cutting operation 308 as shown in FIG. 13. Extruding operation 302 extrudes a continuous plastics-material sheet 314. Heating operation 304 heats plastics-material sheet 314. Molding operation 306 molds continuous plastics-material sheet 314 into a continuous molded sheet 316 that includes a set of non-perforated covers 318 and a lid-carrier sheet 320. Cutting operation 308 cuts non-perforated covers 318 from lid-carrier sheet 320 and provides cuts to each non-perforated cover 318 to form either lid 14B in beverage mode or lid 14D in dessert mode.

Extrusion operation 302 extrudes continuous plastics-material sheet 314 that is either passed on to heating operation 304 or accumulated and stored for use at a later time in heating operation 304 as shown in FIG. 13. Extrusion operation 302 is accomplished by extruding continuous plastics-material sheet 314. As an example, plastics material is polypropylene, but may be any other suitable plastics material. An extruder machine 322 is supplied with raw plastics pellets which are heated and processed by extruder machine 322. As an example, continuous plastics-material sheet 314 is formed at a given rate and sufficient thickness to support downstream processes such as heating operation 304 and molding operation 306. In another example, extrusion operation 302 may be omitted and plastics-material sheet 314 may be purchased.

Heating operation 304 is accomplished illustratively by passing continuous plastics-material sheet 314 under a heater 324 as shown in FIG. 13. Heater 324 applies heat 326 to continuous plastics-material sheet 314 to cause continuous plastics-material sheet 314 to be heated to a temperature appropriate for molding in molding operation 306.

Molding operation 306 is accomplished by positioning a portion of continuous plastics-material sheet 314 in a mold cavity formed between an upper female mold core 328 and a lower male mold core 330 as shown in FIG. 13. During molding operation 306, cores 328, 330 move toward one another to form continuous molded sheet 316. Continuous molded sheet 316 includes a set of individual non-perforated covers 318 and lid-carrier sheet 320 coupled to non-perforated covers 318. After molding operation 306 is complete, mold cores 328, 330 move apart from one another and continuous molded sheet 316 moves to cutting operation 308.

Cutting operation 308 is performed by moving continuous molded sheet 316 past a stamping machine that includes, for example, either a first or a second stamping die. When lid 14B in beverage mode is desired, first stamping die may be used. When lid 14D in dessert mode is desired, second stamping die may be used. First stamping die may be used to separate non-perforated cover 318 from lid-carrier sheet 320 and form lid 14B that includes a straw receiver 38 and sip flap 74. Second stamping die may be used to separate non-perforated covers 318 from lid-carrier sheet 320 and form utensil-receiving aperture 13. While a stamping operation is discussed, any other suitable methods of cutting may be used.

After cutting operation 308 is complete, an accumulating operation may be performed in which individual lids are nested in one another so that a lid stack is established. As an example, lids are nested in one another by the stamping machine. After each lid stack includes a sufficient number of lids, the lid stack is packaged for transport or storage.

As shown in FIG. 14, determination of which stamping die to be used in cutting operation 308 is determined by a first decision 332 and a second decision 334. First decision 332 asks whether the lid will be used in a hot/cold beverage mode. If the answer is yes, then the first stamping die is used and lid 14B is produced. If the answer is no, then second decision 334 asks whether the lid will be used in a dessert mode. If the answer is yes, then the second stamping die is used and lid 14D is produced by cutting out elevated basin 15 from central closure 16. If the answer is no, then first decision 332 is asked again. If dessert mode is desired, elevated basin 15 is removed and recycled along with lid-carrier sheet 320. The lid in either beverage mode or dessert may be coupled to the same cup 12 as suggested in FIG. 1.

Cup 12 includes brim 20, a floor 29, and a side wall 40 extending from brim 20 to floor 29 as shown in FIG. 1. Side wall 40 is formed to include a large-diameter top portion 46 appended to brim 20, a small-diameter bottom portion 48, and a body portion 50 located between top and bottom portions 46, 48 as shown in FIG. 1. Side wall 40 also includes an annular top transitional portion 52 interconnecting top portion 46 and body portion 50. Side wall 40 also includes a scalloped annular bottom transitional portion 54 interconnecting body portion 50 and bottom portion 48 as suggested in FIG. 1.

Figures 5, 6:
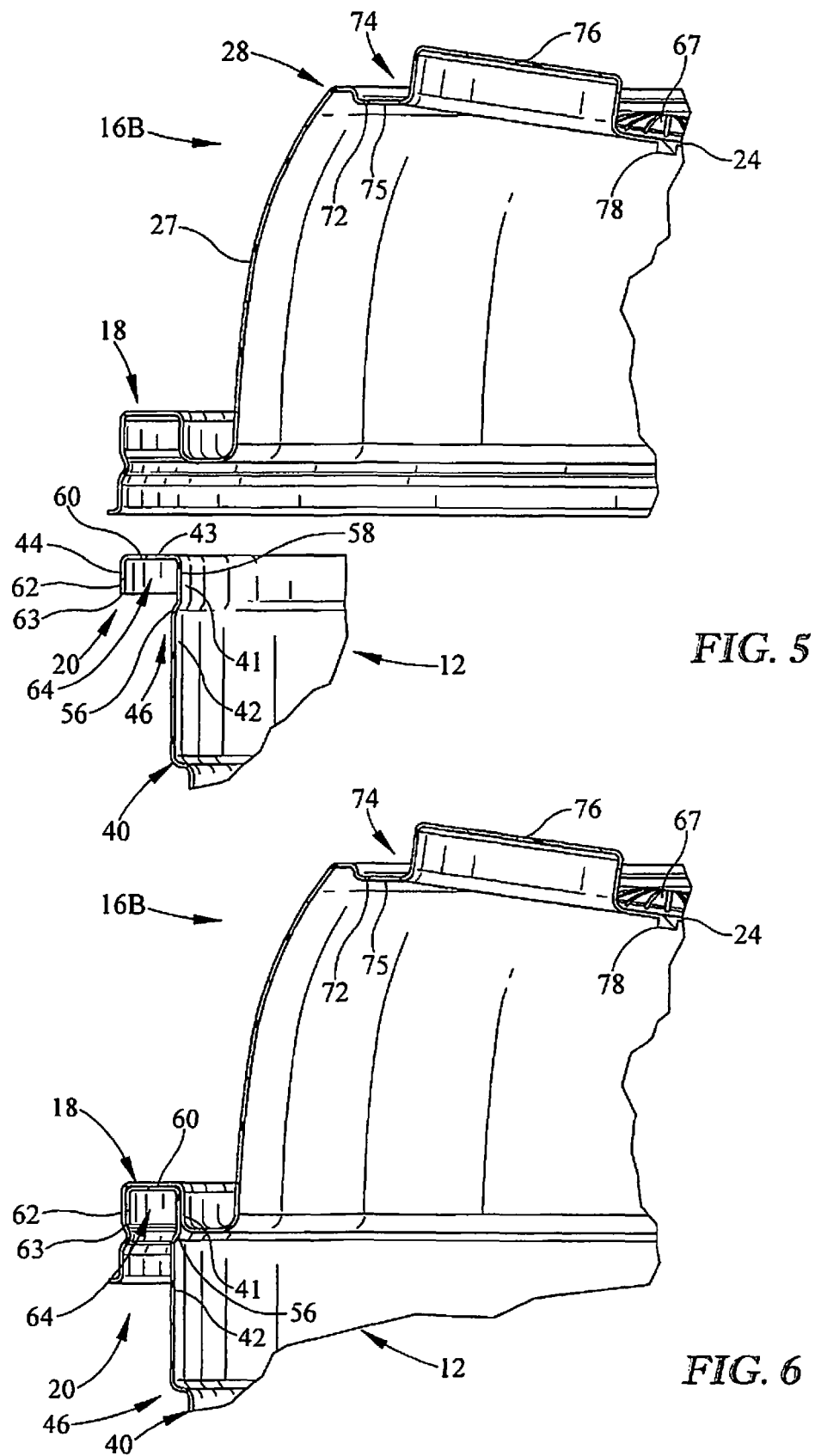
FIG. 5 is an enlarged partial elevation view of the lid and cup of FIG. 1 with portions broken away to suggest the interaction between a rim included in the lid and a brim included in the cup.
FIG. 6 is a view similar to FIG. 5 after the rim of the lid has engaged the brim of the cup.

As shown, for example, in FIGS. 4 and 5, brim 20 includes, in series, a lid retainer 56, an inner annular strip 58, an annular bridge 60, and an outer annular strip 62. Lid retainer 56 is rooted to an upper portion of top portion 46 to anchor brim 20 to top portion 46. Outer annular strip 62 is oriented to lie in concentric relation to inner annular strip 58 and annular bridge 60 extends horizontally to link inner and outer annular strips 58, 62 as suggested in FIG. 5. Strips 58, 62 and bridge 60 cooperate to form a downwardly opening annular channel 64 above an exterior surface of lid retainer 56 in the illustrated embodiment. Outer annular strip 62 includes an axially downwardly facing annular terminal end 63.

Brim 20 is configured to form several seal surfaces arranged to mate with companion portions of lid 14B, 14D as suggested, for example, in FIGS. 4 and 5. Large-diameter top portion 46 includes radially inwardly facing first annular seal surface 41. Inner annular strip 58 includes second radially inwardly facing second annular seal surface 42. Annular bridge 60 includes axially upwardly facing third annular seal surface 43. Outer annular strip 62 includes radially outwardly facing fourth annular seal surface 44.

Ring-shaped brim mount 18 interconnects central closure 16B, 16D to brim 20 of cup 12 as suggested in FIGS. 1, 5, and 6. Central closure 16 further includes a series of deformable product-identification domes 65, 66, 67, 68. As shown in FIGS. 2-4, the series of deformable product-identification domes 65, 66, 67, 68 are formed in elevated basin 15 and are arranged to extend upwardly away from ring-shaped brim mount 18. As shown in FIG. 3, each one of the series of deformable product-identification domes 65, 66, 67, 68 is spaced apart from every other one of the series of deformable product-identification domes 65, 66, 67, 68 and is spaced apart from straw receiver 38. In use, a user may apply a force to one or more of the series of deformable product-identification domes 65, 66, 67, 68 causing one or more of the series of deformable product-identification domes 65, 66, 67, 68 to deform and extend downwardly toward ring-shaped brim mount 18.

Central closure 16 includes central well 19 that is converted into straw receiver 38. Central well 19 is appended to elevated basin 15 to extend downwardly toward ring-shaped brim mount 18. A first aperture 23 is formed in elevated basin 15 that opens into and is defined by central well 19. After conversion, first aperture 23 opens into and is defined by straw receiver 38. As shown in FIG. 8, first aperture 23 and sip aperture 72 are formed in a common plane 69 defined by a portion of the elevated basin 15.

Central closure 16 also includes nub 21 that is converted into a straw-receiver closure 76 as a result of making sip-flap cut. As shown in FIGS. 2-4, straw-receiver closure 76 is appended to sip flap 74 to move therewith. Straw-receiver closure 76 is arranged to extend through first aperture 23 of elevated basin 15 to mate with straw receiver 38 to cause straw receiver 38 to be sealed when sip-flap tab 75 is in the closed position as shown in FIG. 9. Straw-receiver closure 76 and straw receiver 38 are both sized to cause sip-flap tab 75 to be retained in the closed position.

Elevated basin 15 includes a raised floor 24 and a curved liquid-retaining wall 25 as shown in FIGS. 2 and 3. Raised floor 24 is coupled to product-retaining shell 17. Curved liquid-retaining wall 25 is coupled to raised floor 24 to extend between and interconnect raised floor 24 to product-retaining shell 17.

Raised floor 24 includes a first floor panel 241 and a second floor panel 242 as shown in FIGS. 2-4. First floor panel 241 is coupled to product-retaining shell 17 to extend downwardly toward ring-shaped brim mount 18. Second floor panel 242 is coupled to first floor panel 241 to extend upwardly away from first floor panel 241 toward curved liquid-retaining wall 25 so as to define an obtuse angle 243 therebetween as shown in FIG. 7.

Product-retaining shell 17 includes a curved product-retaining wall 27 and a top wall 28 as shown in FIG. 2-6. Curved product-retaining wall 27 is coupled to ring-shaped brim mount 18 to extend upwardly away from brim 20 of cup 12. Top wall 28 extends between and interconnects curved product-retaining wall 27 and elevated basin 15.

Figure 12A:
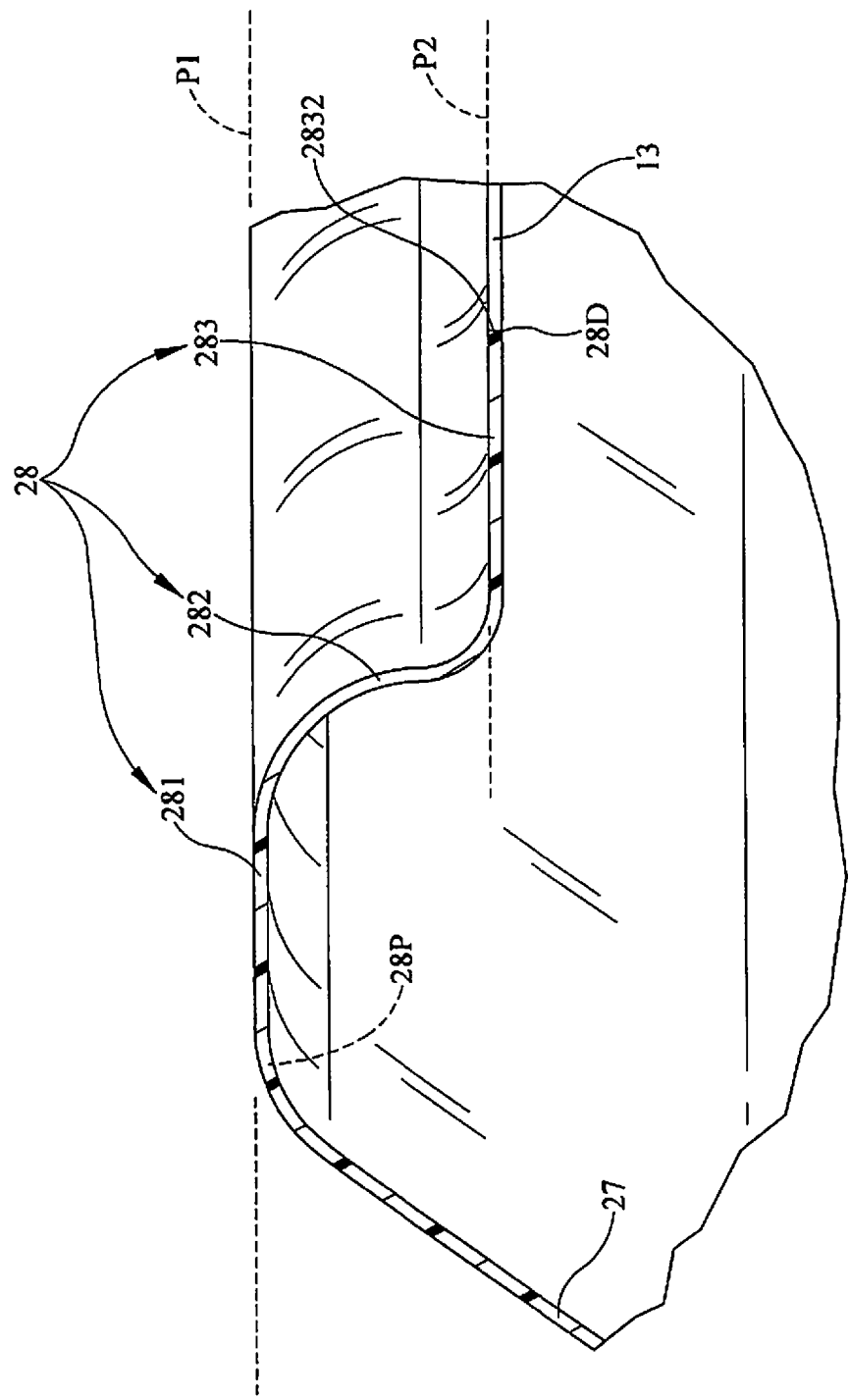
FIG. 12A is an enlarged partial elevation view of the lid of FIG. 12 showing a top wall included in the product-retaining shell.

Top wall 28 includes a proximal end 28P and a distal end 28D spaced apart from proximal end 28P as shown in FIG. 12A. Proximal end 28P is coupled to curved product-retaining wall 27. Distal end 28D is coupled to elevated basin 15 and defines utensil-receiving aperture 13 when the utensil-receiver cut is made.

Top wall 28 further includes an upper ring 281, a lower lip 283 spaced apart below upper ring 281, and a medial band 282 as shown in FIG. 12A. Upper ring 281 is coupled to curved product-retaining wall 27. Lower lip 283 is coupled to elevated basin 15. Medial band 282 extends between and interconnects upper ring 281 and lower lip 283 as shown in FIG. 12A. Lower lip 283 includes a first lip end 2831 and a second lip end 2832. First lip end 2831 is coupled to medial band 282 and second lip end 2832 is spaced apart from first lip end 2831. Second lip end 2832 is distal end 28D of top wall 28.

As shown in FIG. 12A, upper ring 281 lies in a first generally horizontal plane P1. Lower lip 283 lies in a second generally horizontal plane P2. First and second generally horizontal planes P1, P2 are spaced apart from one another and generally parallel to one another as shown, for example, in FIG. 12A.

An illustrative method of producing a lid for a cup comprises the steps of providing non-perforated cover 318 and converting non-perforated cover 318 into a selected one of first perforated lid 14B and second perforated lid 14D. First perforated lid 14B is formed by severing a first portion of central closure 16 to establish straw receiver 38 that forms a straw-receiving aperture in elevated basin 15 when a straw is inserted into straw receiver 38. Second perforated lid 14D is formed by severing a second portion of central closure 16 to cause elevated basin 15 to be separated from curved product-retaining wall 27 so that utensil-receiving aperture 13 is formed in central closure 16 as suggested in FIG. 14.

Lid 14B for a cup 12 comprises ring-shaped brim mount 18, central closure 16, and a product dispenser 11 as shown in FIG. 1. Ring-shaped brim mount 18 is adapted to couple to brim 20 of cup 12. Central closure 16 includes elevated basin 15 that is arranged to lie above and in spaced-apart relation to ring-shaped brim mount 18.

Elevated basin 15 includes raised floor 24, curved liquid-retaining wall 25, and a product-retaining shell 17 as shown in FIGS. 1 and 2. Product-retaining shell 17 is coupled to a perimeter of curved liquid-retaining wall 25 and raised floor 24. Product-retaining shell 17 is arranged to extend downwardly toward ring-shaped brim mount 18 to couple to ring-shaped brim mount 18.

Product dispenser 11 includes straw receiver 38 and a sip-flap tab 75. Straw receiver 38 is coupled to raised floor 24 to extend downwardly away from raised floor 24 toward ring-shaped brim mount 18. Straw receiver 38 is adapted to receive a straw therein. Sip-flap tab 75 is coupled to raised floor 24 to move between the closed position in which sip-flap tab 75 lies in and closes sip aperture 72 formed in raised floor 24 and the opened position in which a portion of sip-flap tab 75 mates with and closes straw receiver 38.

Raised floor 24 is formed to include first aperture 23 defined by straw receiver 38. A portion of the sip-flap tab 75 extends through first aperture 23 to mate with straw receiver 38. First aperture 23 and the sip aperture 72 lie in common plane 69 extending through a portion of raised floor 24.

Lids 14B, 14D minimize the different types of lid inventory that is kept for cups of similar diameters. The lid is configured to fit hot, cold, and desert cup types. Cup 12 may be made of expanded polystyrene foam, plastics materials, paper or any other suitable alternative. Lids 14B, 14D are configured to simplify internal tooling changeover by only changing trim tools, also called stamping dies to produce either lid 14B or 14D. Lids 14B, 14D could be made of plastics material (clear, opaque, or colored) which may be thermoformed. Lids 14D may be a one-piece item which would have the geometry to have elevated basin 15 cut out to allow for access to deserts with a spoon. Lid 14B would be produced with straw receiver 38 and sip flap 74.

Lid 14B may be used for sipping or drinking through a straw regardless of the product included in the container. Cuts made in straw receiver 38 may be used to vent steam emitted from a hot beverage.

Another embodiment of a lid 214B in accordance with the present disclosure is shown, for example, in FIGS. 15-17. Lid 214B is configured in the beverage mode. However, lid 214B may be reconfigured by applying cutting operation 308 to be in the dessert mode. Applying cutting operation 308 to lid 216B converts lid 214B into lid 14D.

Lid 214B includes a central closure 216B and ring-shaped brim mount 18 as shown in FIGS. 15-17. Ring-shaped brim mount 18 is configured to mount on a brim 20 included in cup 12. Central closure 216B is appended to ring-shaped brim mount 18 to extend upwardly away from brim 20 of cup 12 to close a mouth opening into a product-receiving chamber 22 formed in cup 12.

Central closure 216B includes an elevated basin 215, product-retaining shell 17, straw receiver 38, and straw-receiver closure 276 as shown in FIGS. 15-17. Elevated basin 215 is arranged to lie spaced apart above ring-shaped brim mount 18. Product-retaining shell 17 is coupled to a perimeter of elevated basin 215 to extend away from elevated basin 215 downwardly to couple to ring-shaped brim mount 18. Straw receiver 38 is appended to elevated basin 215 to extend downwardly toward ring-shaped brim mount 18. Straw-receiver closure 276 is appended to elevated basin 215 to extend upwardly away from ring-shaped brim mount 18. Product-retaining shell 17 remains substantially unchanged during conversion of non-perforated cover 318 to lid 214B.

Elevated basin 215 includes a raised floor 224 and a curved liquid-retaining wall 225 as shown in FIGS. 15-17. Raised floor 224 is coupled to product-retaining shell 17. Curved liquid-retaining wall 225 is coupled to raised floor 224 to extend between and interconnect raised floor 224 to product-retaining shell 17.

Raised floor 224 includes a first floor panel 2241 and a second floor panel 2242 as shown in FIGS. 15-17. First floor panel 2241 is coupled to product-retaining shell 17 to extend downwardly toward ring-shaped brim mount 18. Second floor panel 2242 is coupled to first floor panel 2241 to extend upwardly away from first floor panel 2241 toward curved liquid-retaining wall 225 as shown in FIG. 17.

During cutting operation 308, a sip flap 274 is formed in central closure 216B. Sip flap 274 includes, for example, a sip-flap tab 275 and a sip-flap hinge 278 as shown in FIGS. 15-17. Sip-flap hinge 278 interconnects sip-flap tab 275 to elevated basin 215 so that sip-flap tab 275 is movable between a closed position shown in FIG. 17 and an opened position. Sip-flap tab 275 when in the closed position lies in and closes first aperture 23 opening into straw receiver 38. Sip-flap tab 275 pivots about a tab axis 77 from the opened position to the closed position to lie in spaced-apart relation to sip aperture 72. Sip-flap hinge 278 extends upwardly away from ring-shaped brim mount 18 as shown in FIGS. 15 and 17. In comparison, sip-flap hinge 78 extends downwardly toward ring-shaped brim mount 18.

The invention claimed is:

1. A lid for a cup, the lid comprising
a ring-shaped brim mount having a round shape with a center point located on a central axis of the lid, the ring-shaped brim mount being adapted to couple to a brim included in a cup,
a central closure including an elevated basin arranged to lie in spaced-apart relation above the ring-shaped brim mount and formed to include a sip aperture and a well aperture, a product-retaining shell coupled to a perimeter of the elevated basin and arranged to extend toward and couple to the ring-shaped brim mount, a well coupled to the elevated basin and arranged to extend toward the ring-shaped brim mount, and a nub coupled to the elevated basin and arranged to extend away from the ring-shaped brim mount,
a sip flap including a sip-flap tab and a sip-flap hinge arranged to extend between and interconnect the sip-flap tab to the elevated basin to allow the sip-flap tab to move between a closed position in which the sip-flap tab lies in and closes the sip aperture and an opened position in which the nub extends into the well aperture,
wherein the elevated basin includes a planar portion formed to include the sip aperture and the well aperture, and wherein the sip flap lies between the ring-shaped brim mount and a top wall of the product-retaining shell.

2. The lid of claim 1, wherein the sip-flap hinge is located between the sip aperture and the well aperture.

3. The lid of claim 2, wherein the nub is arranged to extend above the product-retaining shell.

4. The lid of claim 3, wherein the well extends below the elevated basin.

5. The lid of claim 4, wherein the sip flap pivots about a tab axis relative to the elevated basin about 180 degrees to move from the closed position to the opened position and the tab axis is arranged to be parallel to the planar portion.

6. The lid of claim 5, wherein the sip-flap tab is about parallel to the planar portion of the elevated basin when the sip flap is in the closed position.

7. The lid of claim 2, wherein the sip-flap tab is formed to include an inner edge and an outer edge surrounding the inner edge, the nub is coupled to the sip-flap tab along the inner edge to lie in a fixed position on the sip-flap tab for movement therewith relative to the elevated basin, and the sip-flap hinge is coupled to the sip-flap tab at the outer edge.

8. The lid of claim 7, wherein the nub is arranged to extend above the product-retaining shell and the well is arranged to extend below the elevated basin.

9. The lid of claim 1, wherein the product-retaining shell includes a product-retaining wall coupled to the ring-shaped brim mount and arranged to extend toward the elevated basin and a top wall arranged to extend between and interconnect the elevated basin and the product-retaining wall.

10. The lid of claim 9, wherein the top wall is arranged to face away from the ring-shaped brim mount.

11. The lid of claim 9, wherein the sip aperture and the well aperture are located between the ring-shaped brim mount and the top wall.

12. The lid of claim 9, wherein the nub is arranged to extend above the top wall.

13. The lid of claim 1, wherein the sip-flap tab pivots about a tab axis relative to the elevated basin about 180 degrees to move from the closed position to the opened position.

14. The lid of claim 13, wherein the sip-flap tab is about parallel to the planar portion of the elevated basin when the sip flap is in the closed position.

15. The lid of claim 14, wherein the nub has a cross-sectional shape that is geometrically similar to a cross-sectional shape of the well.

16. A lid for a cup, the lid comprising
a ring-shaped brim mount having a round shape with a center point located on a central axis of the lid, the ring-shaped brim mount being adapted to couple to a brim included in a cup,
a central closure including an elevated basin arranged to lie above and in spaced-apart relation to the ring-shaped brim mount, the elevated basin including a floor having a planar portion formed to include a sip aperture and a well aperture therein, and an annular product-retaining shell coupled to a perimeter of the elevated basin and arranged to extend downwardly toward the ring-shaped brim mount to couple to the ring-shaped brim mount,
a sip-flap tab coupled to the planar portion of the floor by a sip-flap hinge, the sip-flap hinge being operable to allow the sip-flap tab to move between a closed position in which the sip-flap tab lies in and closes the sip aperture and an opened position in which a portion of the sip-flap tab extends into the well aperture, and
wherein the sip flap lies between the ring-shaped brim mount and a top wall of the product-retaining shell.

17. The lid of claim 16, wherein the sip flap pivots about a tab axis relative to the elevated basin about 180 degrees to move from the closed position to the opened position, the sip-flap tab is about parallel to the planar portion of the elevated basin when the sip-flap tab is in the closed position, the tab axis and the sip-flap hinge are located between the sip aperture and the well aperture, a nub is coupled to the sip-flap tab to move therewith and is arranged to extend above the annular product-retaining shell when the sip-flap tab is in the closed position, a well coupled to the elevated basin and arranged to extend below the elevated basin, the well aperture is arranged to open into the well, the sip aperture and the well aperture are located between the ring-shaped brim mount and a top wall of the annular product-retaining shell, the sip aperture and the well aperture are in coplanar relation to one another, and the well aperture is located radially inward of the sip aperture between the sip aperture and the central axis.

18. A lid for a cup, the lid comprising
a ring-shaped brim mount having a round shape with a center point located on a central axis of the lid, the ring-shaped brim mount being adapted to couple to a brim included in a cup,
a central closure including an elevated basin arranged to lie in spaced-apart relation above the ring-shaped brim mount and formed to include a sip aperture and a well aperture, a product-retaining shell coupled to a perimeter of the elevated basin and arranged to extend toward and couple to the ring-shaped brim mount, a well coupled to the elevated basin and arranged to extend toward the ring-shaped brim mount, and a nub coupled to the elevated basin and arranged to extend away from the ring-shaped brim mount, and
a sip flap including a sip-flap tab and a sip-flap hinge arranged to extend between and interconnect the sip-flap tab to the elevated basin to allow the sip-flap tab to move between a closed position in which the sip-flap tab lies in and closes the sip aperture and an opened position in which the nub extends into the well aperture,
wherein the elevated basin includes a planar portion formed to include the sip aperture and the well aperture, the planar portion having a negative slope extending in the direction of the well aperture.

\* \* \* \* \*